United States Patent
Kimura (10) Patent No.: US 11,483,503 B2
(45) Date of Patent: Oct. 25, 2022

(54) THREE-DIMENSIONAL SENSOR INCLUDING BANDPASS FILTER HAVING MULTIPLE PASSBANDS

(71) Applicant: Magik Eye Inc., New York, NY (US)

(72) Inventor: Akiteru Kimura, Hachioji (JP)

(73) Assignee: Magik Eye Inc., New York, NY (US)

( * ) Notice: Subject to any disclaimer, the term of this patent is extended or adjusted under 35 U.S.C. 154(b) by 0 days.

(21) Appl. No.: 16/740,931

(22) Filed: Jan. 13, 2020

(65) Prior Publication Data
US 2020/0236315 A1    Jul. 23, 2020

Related U.S. Application Data (60) Provisional application No. 62/794,631, filed on Jan. 20, 2019.

(51) Int. Cl.
*H04N 5/369* (2011.01)
*G06T 7/521* (2017.01)
*G01S 17/48* (2006.01)

(52) U.S. Cl.
CPC ......... *H04N 5/36965* (2018.08); *G01S 17/48* (2013.01); *G06T 7/521* (2017.01); *G06T 2207/10024* (2013.01); *G06T 2207/10028* (2013.01); *G06T 2207/10048* (2013.01)

(58) Field of Classification Search
None
See application file for complete search history.

(56) References Cited

U.S. PATENT DOCUMENTS

| | | |
|---|---|---|
| 4,914,460 A | 4/1990 | Caimi et al. |
| 5,061,062 A | 10/1991 | Schneiter |
| 5,699,444 A | 12/1997 | Palm |
| 5,730,702 A | 3/1998 | Tanaka et al. |

(Continued)

FOREIGN PATENT DOCUMENTS

| | | |
|---|---|---|
| CN | 101794065 A | 8/2010 |
| CN | 102193295 A | 9/2011 |

(Continued)

OTHER PUBLICATIONS

International Search Report and Written Opinion mailed in corresponding PCT/US2020/013330 dated May 7, 2020, 11 pages.

*Primary Examiner* — Rebecca A Volentine
(74) *Attorney, Agent, or Firm* — Tong, Rea, Bentley & Kim, LLC (57) ABSTRACT

An example apparatus includes a light projecting system, a light receiving system, and a controller. The light projecting system projects beams of light of a wavelength that is invisible. The beams form a pattern on a surface when the beams are incident upon the surface. The light receiving system acquires an image of the pattern on the surface. The controller calculates a distance to the surface based on the image. The light receiving system includes a lens, an imaging sensor, and a bandpass filter. The imaging sensor includes a first subset of photodetectors sensitive to wavelengths of light that are visible and a second subset of photodetectors sensitive to the wavelength of light that is invisible. The bandpass filter includes a first passband whose range corresponds to the wavelengths of light that are visible and a second passband whose range corresponds to the wavelength of light that is invisible.

20 Claims, 6 Drawing Sheets

(56) References Cited

U.S. PATENT DOCUMENTS

| | | |
|---|---|---|
| 5,870,136 A | 2/1999 | Fuchs et al. |
| 5,980,454 A | 11/1999 | Broome |
| 6,038,415 A | 3/2000 | Nishi et al. |
| 6,122,039 A | 9/2000 | Schumacher |
| 6,442,476 B1 | 8/2002 | Poropat |
| 6,668,082 B1 | 12/2003 | Davison et al. |
| 6,937,350 B2 | 8/2005 | Shirley |
| 7,191,056 B2 | 3/2007 | Costello et al. |
| 7,193,645 B1 | 3/2007 | Aagaard et al. |
| 7,375,803 B1* | 5/2008 | Bamji ............... G01S 7/4816 356/4.01 |
| 7,589,825 B2 | 9/2009 | Orchard et al. |
| 9,098,909 B2 | 8/2015 | Nomura |
| 9,488,757 B2 | 11/2016 | Mukawa |
| 9,536,339 B1 | 1/2017 | Worley et al. |
| 9,686,539 B1 | 6/2017 | Zuliani et al. |
| 9,888,225 B2 | 2/2018 | Znamensky et al. |
| 9,986,208 B2 | 5/2018 | Chao et al. |
| 10,223,793 B1 | 3/2019 | Ebrahimi et al. |
| 11,158,074 B1 | 10/2021 | Kantor |
| 2003/0071891 A1 | 4/2003 | Geng |
| 2004/0041996 A1 | 3/2004 | Abe |
| 2004/0167744 A1 | 8/2004 | Lin et al. |
| 2005/0111009 A1 | 5/2005 | Keightley |
| 2005/0288956 A1 | 12/2005 | Speicher |
| 2006/0044546 A1 | 3/2006 | Lewin et al. |
| 2006/0055942 A1 | 3/2006 | Krattiger |
| 2006/0290781 A1 | 12/2006 | Hama |
| 2007/0091174 A1 | 4/2007 | Kochi et al. |
| 2007/0165243 A1 | 7/2007 | Kang et al. |
| 2007/0206099 A1 | 9/2007 | Matsuo |
| 2008/0259354 A1 | 10/2008 | Gharib |
| 2010/0007719 A1 | 1/2010 | Frey et al. |
| 2010/0149315 A1 | 6/2010 | Qu et al. |
| 2010/0209002 A1 | 8/2010 | Thiel et al. |
| 2010/0223706 A1 | 9/2010 | Becker et al. |
| 2010/0238416 A1 | 9/2010 | Kuwata |
| 2010/0303341 A1 | 12/2010 | Hausler |
| 2011/0037849 A1 | 2/2011 | Niclass et al. |
| 2011/0188054 A1 | 8/2011 | Petronius et al. |
| 2012/0050528 A1 | 3/2012 | Davies |
| 2012/0051588 A1 | 3/2012 | Mceldowney |
| 2012/0056982 A1 | 3/2012 | Katz et al. |
| 2012/0062758 A1 | 3/2012 | Devine et al. |
| 2012/0076375 A1* | 3/2012 | Saijo ............... G06K 9/00375 382/128 |
| 2012/0105867 A1 | 5/2012 | Komatsu |
| 2012/0113252 A1 | 5/2012 | Yang et al. |
| 2012/0219699 A1 | 8/2012 | Pettersson |
| 2012/0225718 A1 | 9/2012 | Zhang |
| 2012/0236288 A1 | 9/2012 | Stanley |
| 2012/0236317 A1 | 9/2012 | Nomura |
| 2012/0307260 A1 | 12/2012 | Keshavmurthy |
| 2013/0038882 A1 | 2/2013 | Umeda et al. |
| 2013/0050710 A1 | 2/2013 | Yamaguchi |
| 2013/0076865 A1 | 3/2013 | Tateno et al. |
| 2013/0088575 A1 | 4/2013 | Park et al. |
| 2013/0155417 A1 | 6/2013 | Ohsawa |
| 2013/0201325 A1 | 8/2013 | Kessler |
| 2013/0242090 A1 | 9/2013 | Yoshikawa |
| 2013/0307933 A1 | 11/2013 | Znamensky et al. |
| 2013/0314688 A1 | 11/2013 | Likholyot |
| 2014/0000520 A1 | 1/2014 | Bareket |
| 2014/0009571 A1 | 1/2014 | Geng |
| 2014/0016113 A1 | 1/2014 | Holt et al. |
| 2014/0036096 A1 | 2/2014 | Sterngren |
| 2014/0071239 A1 | 3/2014 | Yokota |
| 2014/0085429 A1 | 3/2014 | Hérbert |
| 2014/0125813 A1 | 5/2014 | Holz |
| 2014/0207326 A1 | 7/2014 | Murphy |
| 2014/0241614 A1 | 8/2014 | Lee |
| 2014/0275986 A1 | 9/2014 | Vertikov |
| 2014/0320605 A1 | 10/2014 | Johnson |
| 2015/0009301 A1 | 1/2015 | Ribnick et al. |
| 2015/0012244 A1 | 1/2015 | Oki |
| 2015/0293210 A1 | 1/2015 | Imamura |
| 2015/0062558 A1 | 3/2015 | Koppal et al. |
| 2015/0077764 A1 | 3/2015 | Braker et al. |
| 2015/0116460 A1 | 4/2015 | Jouet |
| 2015/0131054 A1 | 5/2015 | Wuellner et al. |
| 2015/0016003 A1 | 6/2015 | Terry et al. |
| 2015/0171236 A1 | 6/2015 | Murray |
| 2015/0248796 A1 | 9/2015 | Iyer et al. |
| 2015/0268399 A1 | 9/2015 | Futterer |
| 2015/0288956 A1 | 10/2015 | Mallet et al. |
| 2015/0323321 A1 | 11/2015 | Oumi |
| 2015/0336013 A1 | 11/2015 | Stenzier et al. |
| 2015/0347833 A1 | 12/2015 | Robinson |
| 2015/0381907 A1* | 12/2015 | Boettiger ......... H01L 27/14627 348/164 |
| 2016/0022374 A1 | 1/2016 | Haider |
| 2016/0033262 A1 | 2/2016 | Kessler |
| 2016/0041266 A1 | 2/2016 | Smits |
| 2016/0050401 A1 | 2/2016 | Gordon |
| 2016/0117561 A1 | 4/2016 | Miyazawa et al. |
| 2016/0128553 A1 | 5/2016 | Geng |
| 2016/0157725 A1* | 6/2016 | Munoz ..................... H04N 5/33 600/430 |
| 2016/0178915 A1 | 6/2016 | Mor et al. |
| 2016/0249810 A1* | 9/2016 | Darty ..................... A61B 5/444 600/477 |
| 2016/0261854 A1 | 9/2016 | Ryu et al. |
| 2016/0267682 A1 | 9/2016 | Yamashita |
| 2016/0288330 A1* | 10/2016 | Konolige ............... G01B 11/24 |
| 2016/0327385 A1 | 11/2016 | Kimura |
| 2016/0328854 A1 | 11/2016 | Kimura |
| 2016/0334939 A1 | 11/2016 | Dawson et al. |
| 2016/0350594 A1 | 12/2016 | McDonald |
| 2016/0377414 A1 | 12/2016 | Thuries et al. |
| 2016/0379368 A1 | 12/2016 | Sakas et al. |
| 2017/0067734 A1 | 3/2017 | Heidemann |
| 2017/0098305 A1 | 4/2017 | Gossow |
| 2017/0102461 A1 | 4/2017 | Tezuka et al. |
| 2017/0135617 A1 | 5/2017 | Alasirniö et al. |
| 2017/0221226 A1 | 8/2017 | Shen et al. |
| 2017/0270689 A1 | 9/2017 | Messely et al. |
| 2017/0284799 A1 | 10/2017 | Wexler et al. |
| 2017/0307544 A1 | 10/2017 | Nagata |
| 2017/0347086 A1* | 11/2017 | Watanabe ............... H04N 13/25 |
| 2018/0010903 A1 | 1/2018 | Takao et al. |
| 2018/0011194 A1 | 1/2018 | Masuda et al. |
| 2018/0012372 A1 | 1/2018 | Takao et al. |
| 2018/0073863 A1 | 3/2018 | Watanabe |
| 2018/0080761 A1 | 3/2018 | Takao et al. |
| 2018/0106606 A1 | 4/2018 | Fujita |
| 2018/0143018 A1 | 5/2018 | Kimura |
| 2018/0156609 A1 | 6/2018 | Kimura |
| 2018/0227566 A1 | 8/2018 | Price et al. |
| 2018/0247424 A1 | 8/2018 | Bleyer |
| 2018/0249142 A1 | 8/2018 | Hicks et al. |
| 2018/0324405 A1 | 11/2018 | Thirion |
| 2018/0329038 A1 | 11/2018 | Lin et al. |
| 2018/0357871 A1 | 12/2018 | Siminoff |
| 2019/0064359 A1 | 2/2019 | Yang |
| 2019/0086198 A1 | 3/2019 | Chen |
| 2019/0107387 A1 | 4/2019 | Kimura |
| 2019/0108743 A1 | 4/2019 | Kimura |
| 2019/0122057 A1 | 4/2019 | Kimura |
| 2019/0295270 A1 | 9/2019 | Kimura |
| 2019/0297241 A1 | 9/2019 | Kimura |
| 2019/0297278 A1* | 9/2019 | Sumi ..................... G02B 5/281 |
| 2019/0377088 A1 | 12/2019 | Kimura |
| 2020/0051268 A1 | 2/2020 | Kimura |
| 2020/0077010 A1* | 3/2020 | Noguchi ............... H04N 5/2354 |
| 2020/0090355 A1 | 3/2020 | Hall |
| 2020/0092524 A1 | 3/2020 | Morris |
| 2020/0182974 A1 | 6/2020 | Kimura |
| 2020/0236315 A1 | 7/2020 | Kimura |
| 2020/0278197 A1 | 9/2020 | Tokimitsu |
| 2020/0309916 A1 | 10/2020 | Kimura |

(56) References Cited

U.S. PATENT DOCUMENTS

| | | | |
|---|---|---|---|
| 2020/0319309 A1 | 10/2020 | Van Nieuwenhove | |
| 2020/0358961 A1 | 11/2020 | Kimura | |

FOREIGN PATENT DOCUMENTS

| | | |
|---|---|---|
| CN | 103428026 A | 4/2013 |
| CN | 103196385 A | 7/2013 |
| CN | 103559735 A | 2/2014 |
| CN | 104160243 A | 11/2014 |
| CN | 104515514 A | 4/2015 |
| CN | 104685868 A | 6/2015 |
| CN | 106067968 A | 11/2016 |
| CN | 106338244 A | 1/2017 |
| CN | 106796179 A | 5/2017 |
| DE | 102016118562 A1 | 3/2017 |
| EP | 0358628 A2 | 3/1990 |
| EP | 1 739 391 A2 | 1/2007 |
| EP | 1 739 391 A2 | 1/2007 |
| EP | 3 171 129 A1 | 5/2017 |
| JP | H045112 A | 2/1992 |
| JP | H0961126 A | 3/1997 |
| JP | 2002-056348 A | 2/2002 |
| JP | 4485365 B2 | 2/2006 |
| JP | 2006-313116 A | 11/2006 |
| JP | 2007-10346 A | 1/2007 |
| JP | 2007-187581 A | 7/2007 |
| JP | 2007-315864 A | 12/2007 |
| JP | 2010-091855 A | 4/2010 |
| JP | 2010-101683 A | 5/2010 |
| JP | 2010-256182 A | 11/2010 |
| JP | 2011-515703 A | 5/2011 |
| JP | 2012-047500 A | 3/2012 |
| JP | 2013-8513179 A | 4/2013 |
| JP | 2014-020978 A | 2/2014 |
| JP | 2014-044113 A | 3/2014 |
| JP | 2014-511590 A | 5/2014 |
| JP | 2014-122789 A | 7/2014 |
| JP | 2014-238259 A | 12/2014 |
| JP | 2016-6166747 A | 9/2016 |
| JP | 6038415 B1 | 12/2016 |
| JP | 6241793 B2 | 12/2017 |
| JP | 2018514783 A | 6/2018 |
| JP | 2019-203822 A | 11/2019 |
| KR | 10-2013-0000356 A | 1/2013 |
| KR | 10-2013-0037152 A | 4/2013 |
| KR | 10-2015-0101749 A | 9/2015 |
| KR | 10-2016-0020323 | 2/2016 |
| KR | 10-2017-0005649 A | 1/2017 |
| KR | 10-2017-0054221 A | 5/2017 |
| KR | 10-2017-0094968 | 8/2017 |
| TW | I320480 B | 2/2010 |
| TW | I451129 B | 4/2012 |
| WO | WO 2012/081506 A1 | 6/2012 |
| WO | WO2013/046927 A1 | 4/2013 |
| WO | WO/2013/145164 | 10/2013 |
| WO | WO2014/0106843 A2 | 7/2014 |
| WO | WO 2014/131064 | 8/2014 |
| WO | WO 2015/166915 A1 | 11/2015 |
| WO | WO 2016/154218 | 9/2016 |
| WO | WO 2017/053368 A1 | 3/2017 |

* cited by examiner

THREE-DIMENSIONAL SENSOR INCLUDING BANDPASS FILTER HAVING MULTIPLE PASSBANDS

CROSS REFERENCE TO RELATED APPLICATIONS

This application claims the priority of U.S. Provisional Patent Application Ser. No. 62/794,631, filed Jan. 20, 2019, which is herein incorporated by reference in its entirety.

BACKGROUND

U.S. patent applications Ser. Nos. 14/920,246, 15/149,323, and 15/149,429 describe various configurations of distance sensors. Such distance sensors may be useful in a variety of applications, including security, gaming, control of unmanned vehicles, and other applications.

The distance sensors described in these applications include light projecting systems (e.g., comprising lasers, diffractive optical elements, and/or other cooperating components) which project beams of light in a wavelength that is substantially invisible to the human eye (e.g., infrared) into a field of view. The beams of light spread out to create a pattern (of dots, dashes, or other artifacts) that can be detected by an appropriate light receiving system (e.g., lens, image capturing device, and/or other components). When the pattern is incident upon an object in the field of view, the distance from the sensor to the object can be calculated based on the appearance of the pattern (e.g., the positional relationships of the dots, dashes, or other artifacts) in one or more images of the field of view, which may be captured by the sensor's light receiving system. The shape and dimensions of the object can also be determined.

For instance, the appearance of the pattern may change with the distance to the object. As an example, if the pattern comprises a pattern of dots, the dots may appear closer to each other when the object is closer to the sensor, and may appear further away from each other when the object is further away from the sensor.

SUMMARY

An example apparatus includes a light projecting system a light receiving system, and a controller. The light projecting system projects a plurality of beams of light of a wavelength that is invisible to the human eye. The plurality of beams of light forms a pattern on a surface when the plurality of beams of light is incident upon the surface. The light receiving system acquires an image of the pattern on the surface. The controller calculates a distance to the surface based on the image of the pattern on the surface. The light receiving system includes a lens; an imaging sensor, and a bandpass filter positioned between the lens and the imaging sensor. The imaging sensor includes a first subset of photodetectors that is sensitive to wavelengths of light that are visible to the human eye and a second subset of photodetectors that is sensitive to the wavelength of light that is invisible to the human eye. The bandpass filter includes at least a first passband whose range corresponds to the wavelengths of light that are visible to the human eye and a second passband whose range corresponds to the wavelength of light that is invisible to the human eye.

In another example, a method includes controlling, by a processing system of a distance sensor, a light projecting system of the distance sensor to project a plurality of beams of light, wherein the plurality of beams of light comprise light of a wavelength that is invisible to a human eye, and wherein the plurality of beams of light forms a pattern on a surface when the plurality of beams of light is incident upon the surface, controlling, by the processing system, a light receiving system of the distance sensor to acquire an image of the pattern on the surface, and calculating, by the processing system, a distance to the surface based on the image of the pattern on the surface. The light receiving system includes a lens, an imaging sensor comprising a plurality of photodetectors, wherein the plurality of photodetectors includes a first subset of photodetectors that is sensitive to wavelengths of light that are visible to the human eye and a second subset of photodetectors that is sensitive to the wavelength of light that is invisible to the human eye, and a first bandpass filter positioned between the lens and the imaging sensor, wherein the first bandpass filter includes at least a first passband whose range corresponds to the wavelengths of light that are visible to the human eye and a second passband whose range corresponds to the wavelength of light that is invisible to the human eye.

In another example, a non-transitory machine-readable storage medium is encoded with instructions executable by a processor of a distance sensor, wherein, when executed, the instructions cause the processor to perform operations. The operations include controlling a light projecting system to project a plurality of beams of light, wherein the plurality of beams of light comprise light of a wavelength that is invisible to a human eye, and wherein the plurality of beams of light forms a pattern on a surface when the plurality of beams of light is incident upon the surface, controlling a light receiving system to acquire an image of the pattern on the surface, and calculating a distance to the surface based on the image of the pattern on the surface. The light receiving system includes a lens, an imaging sensor comprising a plurality of photodetectors, wherein the plurality of photodetectors includes a first subset of photodetectors that is sensitive to wavelengths of light that are visible to the human eye and a second subset of photodetectors that is sensitive to the wavelength of light that is invisible to the human eye, and a first bandpass filter positioned between the lens and the imaging sensor, wherein the first bandpass filter includes at least a first passband whose range corresponds to the wavelengths of light that are visible to the human eye and a second passband whose range corresponds to the wavelength of light that is invisible to the human eye.

DETAILED DESCRIPTION

The present disclosure broadly describes an apparatus, method, and non-transitory computer-readable medium for operating a three-dimensional sensor including a bandpass filter having multiple passbands. As discussed above, distance sensors such as those described in U.S. patent applications Ser. Nos. 14/920,246, 15/149,323, and 15/149,429 determine the distance to an object (and, potentially, the shape and dimensions of the object) by projecting beams of light that spread out to create a pattern (e.g., of dots, dashes, or other artifacts) in a field of view that includes the object. The beams of light may be projected from one or more laser light sources which emit light of a wavelength that is substantially invisible to the human eye, but which is visible to an appropriate detector (e.g., of the light receiving system). The three-dimensional distance to the object may then be calculated based on the appearance of the pattern to the detector.

In some examples, the detector of the light receiving system may comprise a red, green, blue, infrared (RGB+IR) sensor. RGB+IR sensors typically include separate sensing elements (e.g., photodetectors in combination with bandpass filters) for capturing images of both visible light and invisible (e.g., infrared) light. This allows the distance sensor to simultaneously produce a two-dimensional (e.g., RGB) image and a three-dimensional (e.g., IR) depth map of an object. In such an application, the infrared sensing elements of the RGB+IR sensor typically include a narrow bandwidth filtering action that is centered on the wavelength of the infrared light emitted by the light projecting system.

However, since the main purpose of the RGB+IR sensor is often to acquire a normal infrared image, the transmission bandwidth of the infrared sensing elements (and, more specifically, of the infrared bandpass filter) may be too wide to allow for simultaneous acquisition of the two-dimensional and three-dimensional images. For instance, noise from the visible wavelengths of light (used to capturing two-dimensional images) may make detection of the invisible wavelengths of light (which are used to calculate distances for three-dimensional depth mapping) difficult. Moreover, replacing the infrared bandpass filter with a narrower-band interference filter (e.g., a coated filter) may not be feasible due to size and/or cost concerns.

Examples of the present disclosure include a distance sensor having a light receiving system in which the imaging sensor includes a bandpass filter that includes at least two passbands (i.e., ranges of frequencies or wavelengths that can pass through): a first passband of visible light (i.e., light that is visible to the human eye, such as light in the RGB wavelengths) and a second passband of invisible light (i.e., light that is not visible to the human eye, such as light in the infrared wavelengths). Thus, invisible light passes to the photodetectors of the imaging sensor that are configured to detect the invisible light, but is blocked from the photodetectors that are not configured to detect the invisible light.

Although examples of the present disclosure are described within the example context of RGB+IR sensors, the detector of the light receiving system disclosed herein may instead comprise a cyan, magenta, yellow (CMY)+IR sensor. Thus, although the examples described below may make reference to an RGB+IR sensor or to wavelengths of light in the RGB ranges, it will be appreciated that any such references are equally applicable to CMY+IR sensors and wavelengths of light in the CMY ranges.

Figure 1:
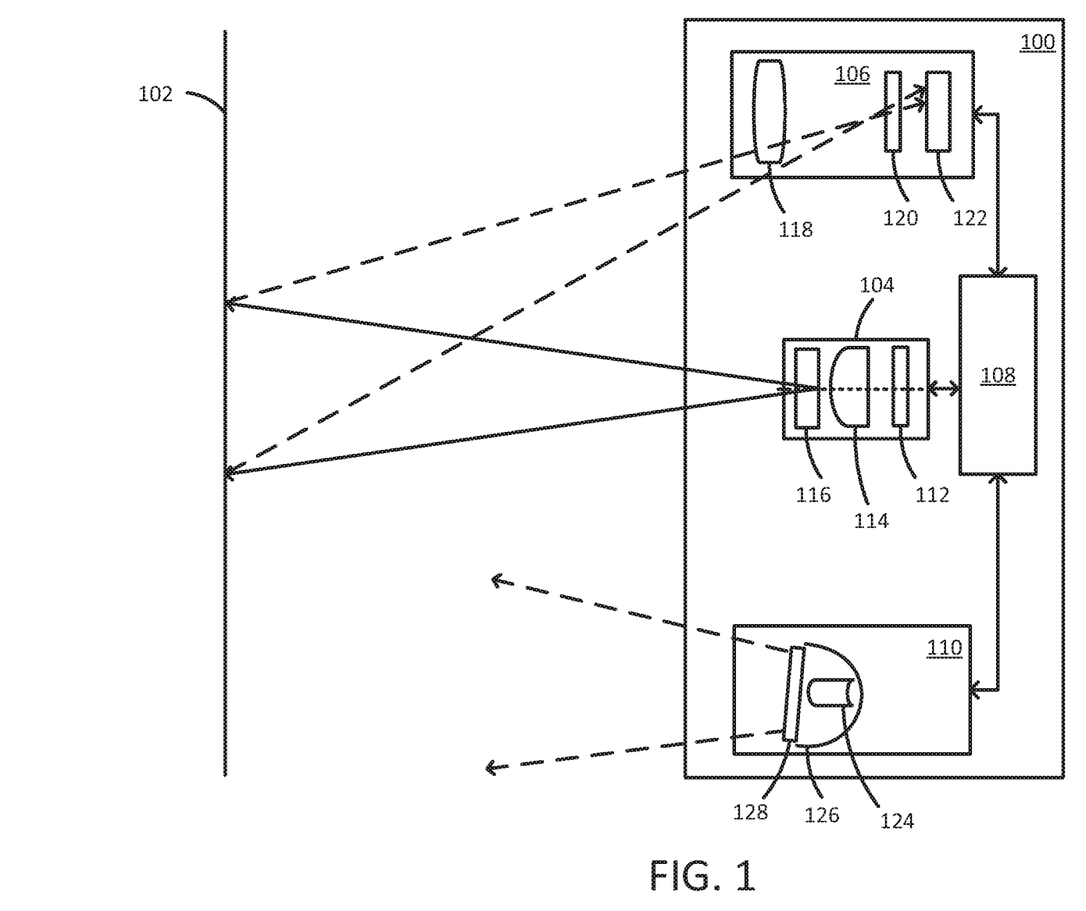
FIG. 1 is a block diagram illustrating an example distance sensor of the present disclosure.

FIG. 1 is a block diagram illustrating an example distance sensor 100 of the present disclosure. The distance sensor 100 may be used to detect the distance to an object or surface 102. In one example, the distance sensor 100 shares many components of the distance sensors described in U.S. patent applications Ser. Nos. 14/920,246, 15/149,323, and 15/149,429. For instance, in one example, the distance sensor comprises a light projecting system 104, a light receiving system 106, and a controller 108. Optionally, the distance sensor 100 may further comprise an illumination system 110.

In one example, the light projecting system may be arranged in a manner similar to any of the arrangements described in U.S. patent application Ser. No. 16/701,949. For instance, the light projecting system 104 may generally comprise a laser emitter 112, a lens 114, and a diffractive optical element (DOE) 116. The laser emitter 112 may comprise at least one laser light emitting diode (LED) that emits a beam of light in a wavelength that is substantially invisible to the human eye (e.g., infrared light). In one example, the laser emitter 112 comprises at least one vertical cavity surface emitting laser (VCSEL) or at least one edge emitting laser (EEL).

The lens 114 may comprise a lens that is configured to magnify the beam of light emitted by the laser emitter 112. For instance, the lens 114 may comprise a converging lens (e.g., a bioconvex or a plano-convex lens), which has positive optical power. In this case, collimated beams of light passing through the lens 114 may converge to a focal point behind the lens 114 before spreading out or diverging from the focal point.

The diffractive optical element 116 may comprise a conical mirror, a holographic film, a grating, or another phase element that uses interference and diffraction to create a distribution of beams of light from a collimated (e.g., single) beam. The diffractive optical element 116 may be positioned at or near the focal point of the lens 114, e.g., between the lens 114 and the surface 102. Thus, the beams of light may pass through the diffractive optical element 116 just as the beams converge or are collimated at the focal point of the lens 114. The diffractive optical element 116 may then split the collimated light into a plurality of beams of light that are distributed to produce a projection pattern on the surface 102.

Although FIG. 1 illustrates a single laser emitter 112, lens 114, and diffractive optical element 116 combination, it should be noted that the light projecting system 104 may comprise any number of laser emitter/lens/diffractive optical element combinations. For instance, a plurality of laser emitter/lens/diffractive optical element combinations may be arranged around the light receiving system 106, e.g., such that the light receiving system 106 is positioned in the center of the plurality of laser emitter/lens/diffractive optical element combinations. In this case, each laser emitter/lens/diffractive optical element combination of the plurality of laser emitter/lens/diffractive optical element combinations may be configured in a manner similar to the laser emitter 112, lens 114, and diffractive optical element 116 illustrated in FIG. 1.

In one example, the plurality of beams of light emitted by the light projecting system 104 fans out in a plurality of different directions from a central axis. The angles between each pair of beams in the plurality of beams of light may be equal. When the plurality of beams of light is incident upon the surface 102, each beam may create a point of light (e.g., a dot, a dash, or the like) on the surface 102. Collectively, the points of light created by the plurality of beams of light form the above-described pattern from which the distance to the surface 102 can be calculated. For instance, the pattern may comprise a grid in which a plurality of points is arranged in a plurality of rows and columns.

The light receiving system 106 of the distance sensor 100 is positioned to capture the reflected image of the pattern that is projected onto the surface 102 by the light projecting system 104. In one example, the light receiving system 106 may generally comprise a lens 118, a filter 120, and an imaging sensor 122.

In one example, the lens 118 may be a wide-angle lens, such as a fisheye lens, that creates a field of view of up to 180 degrees (e.g., a hemispherical field of view).

In one example, the filter 120 may comprise a first bandpass filter (e.g., an interference filter) that has a plurality of passbands, where at least a first passband and a second passband of the plurality of passbands are configured to allow light of different wavelengths to pass through (but to block all other wavelengths of light). For instance, the first passband may transmit one or more wavelengths of light that are visible to the human eye (e.g., RGB wavelengths), while the second passband may transmit one or more wavelengths of light that are invisible to the human eye (e.g., infrared wavelengths). In one example, the portions of the first bandpass filter that correspond to the second passband may be coated.

Figure 2:
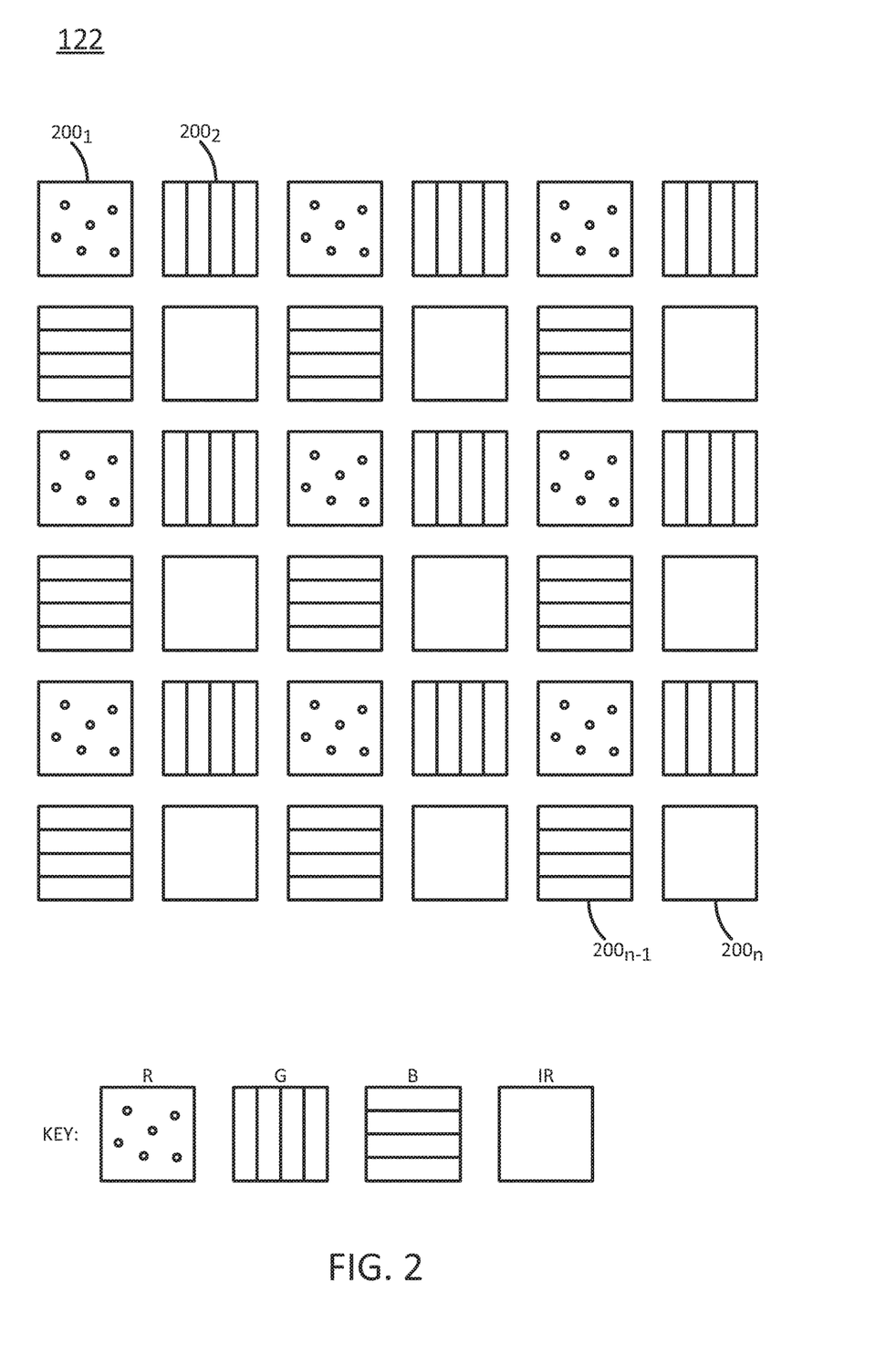
FIG. 2 illustrates one example of the imaging sensor of FIG. 1

In one example, the imaging sensor 122 comprises a plurality of photodetectors (or pixels), where the plurality of photodetectors may be arranged in an array. FIG. 2, for instance, illustrates one example of the imaging sensor 122 of FIG. 1. As illustrated in FIG. 2, the imaging sensor 122 may comprise a plurality of photodetectors $200_1$-$200_n$ (hereinafter individually referred to as a "photodetector 200" or collectively referred to as "photodetectors 200"), where the photodetectors 200 are arranged in a square (e.g., 6×6) array. In other examples, however, the array may be larger or smaller and may have a different shape. The photodetectors 200 may comprise complementary metal-oxide-semiconductor (CMOS) photodetectors.

As indicated by the key in FIG. 2, the plurality of photodetectors 200 may include photodetectors that are sensitive to different wavelengths of light. For instance, the plurality of photodetectors may include photodetectors that are sensitive to wavelengths of light that are visible to the human eye, such as red photodetectors (e.g., photodetector $200_1$), green photodetectors (e.g., photodetector $200_2$), and blue photodetectors (e.g., photodetector $200_{n-1}$). The plurality of photodetectors may also include photodetectors that are sensitive to wavelengths of light that are invisible to the human eye, such as infrared photodetectors (e.g., photodetector $200_n$). Thus, the plurality of photodetectors may include a first subset of photodetectors that is sensitive to wavelengths of light that are visible to the human eye (e.g., the RGB photodetectors) and a second subset of photodetectors that is sensitive to the wavelength of light that is invisible to the human eye (e.g., the IR photodetectors).

The passbands of the filter 120 may be positioned accordingly. For instance, passbands that allow visible red light to pass may be positioned over the red photodetectors 200 of the imaging sensor 122; passbands that allow visible green light to pass may be positioned over the green photodetectors 200 of the imaging sensor 122; passbands that allow visible blue light to pass may be positioned over the blue photodetectors 200 of the imaging sensor 122; and passbands that allow invisible infrared (or other wavelengths of light that are invisible to the human eye) to pass may be positioned over the infrared photodetectors 200 of the imaging sensor 122. Thus, infrared light emitted for three-dimensional distance sensing may be input only to the photodetectors 200 with the IR filters, while other wavelengths of light can be recognized as color images by the photodetectors with the RGB filters. Thus, the imaging sensor 122 can detect red, green, blue, and infrared simultaneously, can detect only infrared, or can detect only red, green, and blue. Because the three-dimensional distance sensing depends on the intensity of the projected pattern of light, and the two-dimensional imaging depends on external brightness, the optimal exposure time for the IR and RGB portions of the imaging sensor 122 may be different.

The illumination system 110, if included in the distance sensor 100, may be configured to provide light in a wavelength that is invisible to the human eye (e.g. infrared light). In one example, the illumination system 110 may comprise a light source 124, a reflector 126, and a filter 128.

The light source 124 may comprise an LED light source, such as one or more white LEDs operated by a pulsed current. The light source 124 may be capable of emitting a spectrum of light that includes both visible and invisible (e.g., infrared) wavelengths. The reflector 126 may comprise a reflective surface (e.g., a mirror) that is shaped to spread the light emitted by the light source 124 in an even manner. For instance, the reflector 126 may comprise a flash diffuser. The reflector 126 may have a conic, parabolic, or other shape. The filter 128 may comprise a second bandpass filter that allows light of wavelengths that are invisible to the human eye (e.g., infrared light) to pass, while blocking other wavelengths of light emitted by the light source 124.

The controller 108 may be operable to send signals to the light projecting system 104, the light receiving system 106, and the illumination system 110. For instance, the controller 108 may send signals to the light projecting system 104 to cause the light projecting system 104 to project the pattern of light onto the surface 102. The controller 108 may also control the duration for which the light projecting system 104 projects the pattern of light onto the surface 102, as well as the timing with which the light projecting system 104 projects the pattern of light onto the surface 102. For instance, the controller 108 may control the duration of pulses emitted by the laser emitter 112 of the light projecting system 104.

The controller 108 may also send signals to the light receiving system 106 to cause the light receiving system 106 to capture images of the pattern of light projected onto the surface 102 and/or to capture two-dimensional (e.g., RGB) images of the surface 102. In further examples, the controller 108 may control the exposure time of the light receiving system 106 (e.g., the duration for which the light receiving system's shutter is open), and the timing with which the light receiving system 106 captures images (including images of the surface 102). In one example, the controller 108 may set two separate exposure durations for the light receiving system 106: a first exposure duration during which an image of the surface 102 is captured at the same time that the light projecting system 104 projects a pattern or light onto the surface 102 (e.g., for three-dimensional distance sensing), and a second exposure duration during which an image of the surface 102 is captured at a time when the light projecting system 104 does not project a pattern of light onto the surface 102 (e.g., for two-dimensional image acquisition). In one example, the controller 108 may alternate between the first exposure duration and the second exposure duration.

The controller 108 may also send signals to the illumination system 110 to cause the illumination system 110 to emit light. The controller 108 may also control the duration for which the illumination system 110 emits light, as well as the timing with which the illumination system 110 emits the light. For instance, the controller 108 may control the duration of pulses emitted by the light source 124 of the illumination system 110.

In further examples, the controller 108 may process images acquired by the light receiving system 106. For instance, the controller 108 may be configured to process the captured image data (e.g., three-dimensional distance data and two-dimensional image data) in order to calculate the distance to the surface 102. For instance, the distance may be calculated in accordance with the methods described in U.S. patent application Ser. Nos. 14/920,246, 15/149,323, and 15/149,429. Thus, in one example, the controller 108 may comprise a processor, such as the processor 602 illustrated in FIG. 6 and described in further detail below.

Figure 3A:
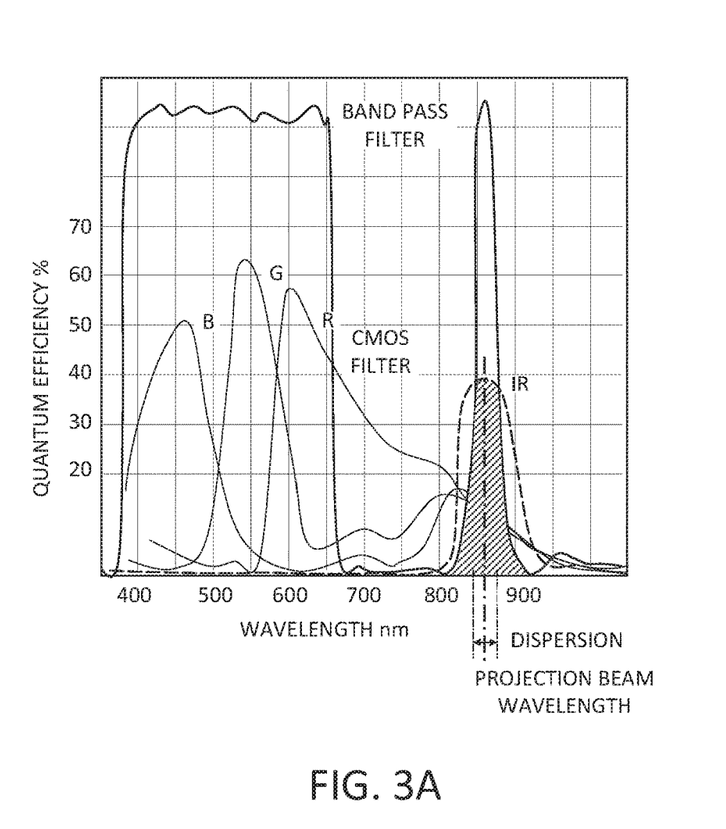
FIGS. 3A-3B are graphs illustrating example wavelength transmission characteristics of the filter and imaging sensor of the light receiving system of the example distance sensor illustrated in FIG. 1.
Figure 3B:
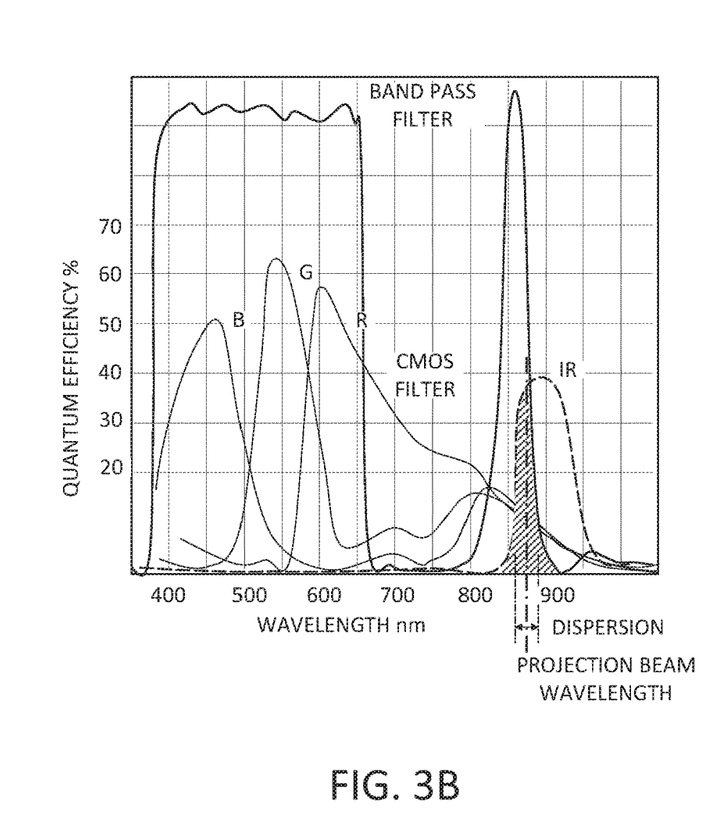

FIGS. 3A-3B are graphs illustrating example wavelength transmission characteristics of the filter 120 and imaging sensor 122 of the light receiving system 106 of the example distance sensor 100 illustrated in FIG. 1. More specifically, FIGS. 3A-3B plot the quantum efficiency (as a percentage of light transmitted) versus wavelength (in nanometers) for the example filter 120 and imaging sensor 122.

In the example illustrated in FIG. 3A, the infrared passband of the filter 120 substantially matches or is narrower than the passband of the infrared photodetector of the imaging sensor 122. Moreover, the wavelength of the coherent light projected by the light projecting system 104 matches the overlapping region of the infrared passband of the filter 120 and the passband of the infrared photodetector of the imaging sensor 122.

In the example illustrated in FIG. 3B, the infrared passband of the filter 120 partially matches the passband of the infrared photodetector of the imaging sensor 122. Moreover, the wavelength of the coherent light projected by the light projecting system 104 matches the overlapping region of the infrared passband of the filter 120 and the passband of the infrared photodetector of the imaging sensor 122.

As discussed above, the coherent light emitted by the light projecting system 104 is reflected by the surface 102, imaged onto the imaging sensor 122 of the light receiving system 106, and captured only by the infrared photodetectors of the imaging sensor 122 (where the imaging sensor 122 also includes RGB photodetectors). Moreover, when a bandpass filter such as the filter 120 is included in the light receiving system 106, wavelengths of light other than the wavelengths emitted by the light projecting system 106 (e.g., visible or non-infrared wavelengths) which may be received by the infrared photodetectors may be significantly cut, which may improve the signal-to-noise ratio (SNR) of the light receiving system 106 and the images acquired by the light receiving system 106. At the same time, the other photodetectors of the imaging sensor 122 (e.g., RGB photodetectors) may capture visible wavelengths of light and acquire a typical two-dimensional (e.g., RGB) image.

Thus, the inclusion of the bandpass filter 120 having multiple passbands (including both visible and invisible light) in the distance sensor's light receiving system 106 ensures that the infrared photodetectors 200 of the imaging sensor 122 receive the infrared light emitted by the light projecting system 104, while the RGB photodetectors 200 do not receive the infrared light emitted by the light projecting system 104. Moreover, by cutting the wavelengths around the wavelength(s) emitted by the light projecting system 104, the bandpass filter 120 may also reduce the SNR of the light receiving system 106 and improve the three-dimensional sensing capabilities of the distance sensor 100.

In further examples of the present disclosure, the disclosed configuration (including the bandpass filter 120) may be implemented in combination with many different kinds of RGB+IR imaging sensors.

In further examples, the disclosed configuration may also be used in combination with distance sensor configurations that produce infrared two-dimensional images (e.g., dark field images), rather than RGB two-dimensional images. In this case, the infrared illumination used for the two-dimensional imaging may be emitted separately from the infrared light emitted for the three-dimensional distance sensing (e.g., from separate infrared light sources and/or at different times to minimize interference). The exposure times for the infrared illumination used for the two-dimensional imaging and the infrared light emitted for the three-dimensional distance sensing may also be different (and this difference may vary with variations in the object(s) being imaged). However, the infrared illumination used for the two-dimensional imaging may still include infrared wavelengths that are within the infrared passband of the bandpass filter 120.

In further examples still, the distance sensor 100 of the present disclosure may be implemented in a stereo camera configuration that is configured to detect distances using a projected image as a feature point.

Figure 4:
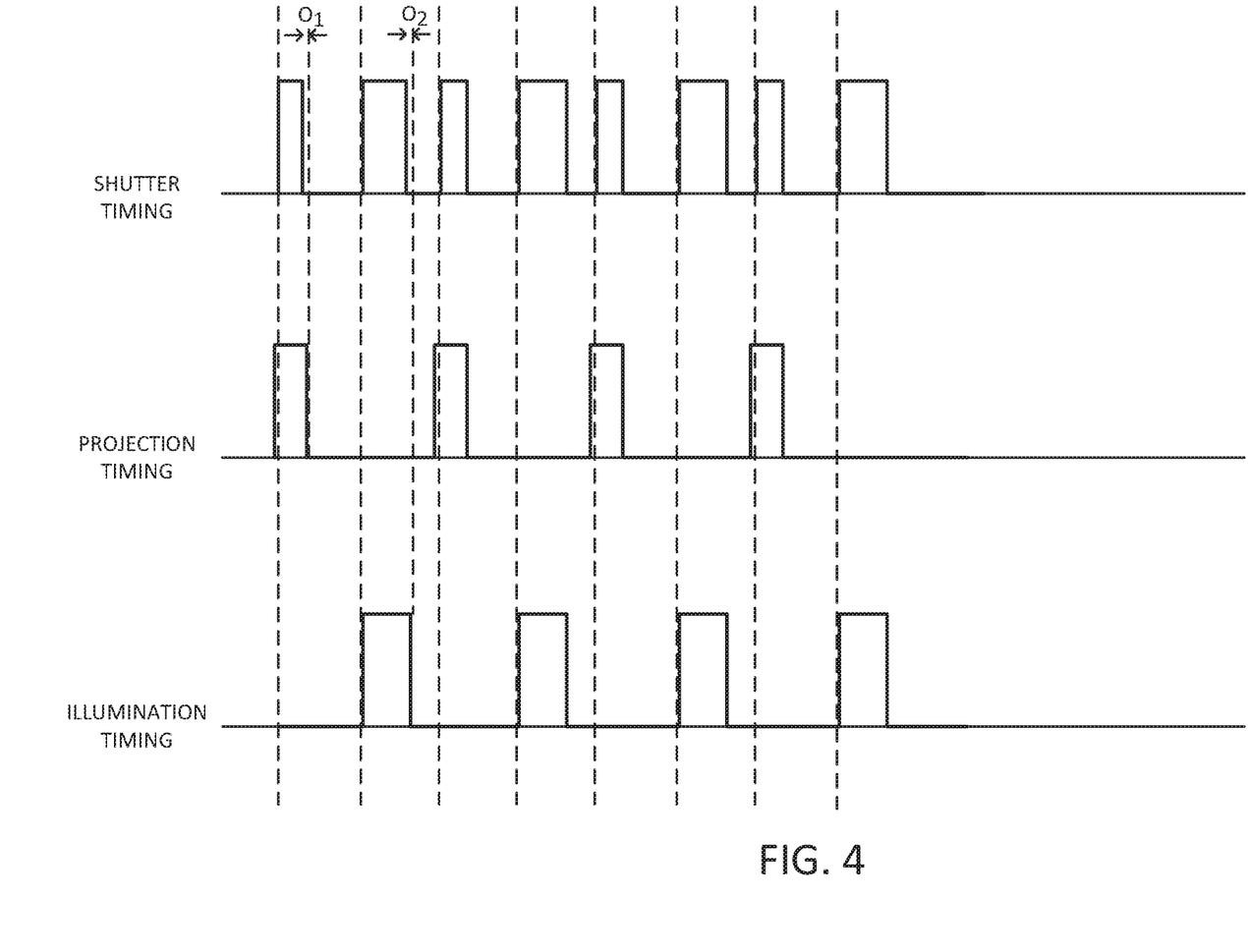
FIG. 4 illustrates an example timing chart showing the relative timing of emissions from the light projecting system and the illumination system of the distance sensor illustrated in FIG. 1.

FIG. 4 illustrates an example timing chart showing the relative timing of emissions from the light projecting system 104 and the illumination system 110 of the distance sensor 100 illustrated in FIG. 1. As described above, the wavelengths of light emitted by the illumination system 110 may include both visible and invisible (e.g., infrared) regions or wavelengths.

When the wavelengths of light emitted by the illumination system 110 are infrared, the infrared photodetectors of the light receiving system's imaging sensor 122 may detect the light emitted by the illumination system 110. In this case, the light emitted by the illumination system 110 may interfere with the beams of light emitted by the light projecting system 104 (which may also comprise infrared wavelengths). This may impair the light receiving system's ability to accurately detect the pattern of light projected by the light projecting system 104.

Thus, as illustrated in FIG. 4, the light projecting system 104 and the illumination system 110 may be controlled (e.g., by the controller 108) so that the light projecting system 104 and the illumination system 110 emit their respective light at different times, in order to minimize interference at the imaging sensor 122.

In addition, as illustrated by the timing offsets $o_1$ and $o_2$, the timing of the light receiving system's shutter may be controlled so that the time for which the shutter is open is not exactly the same as the time for which the light is emitted (by either the light projecting system 104 or the illumination system 110). For instance, the shutter may open just before or just after light emission commences, and/or the shutter may close just before or just after light emission commences.

Figure 5:
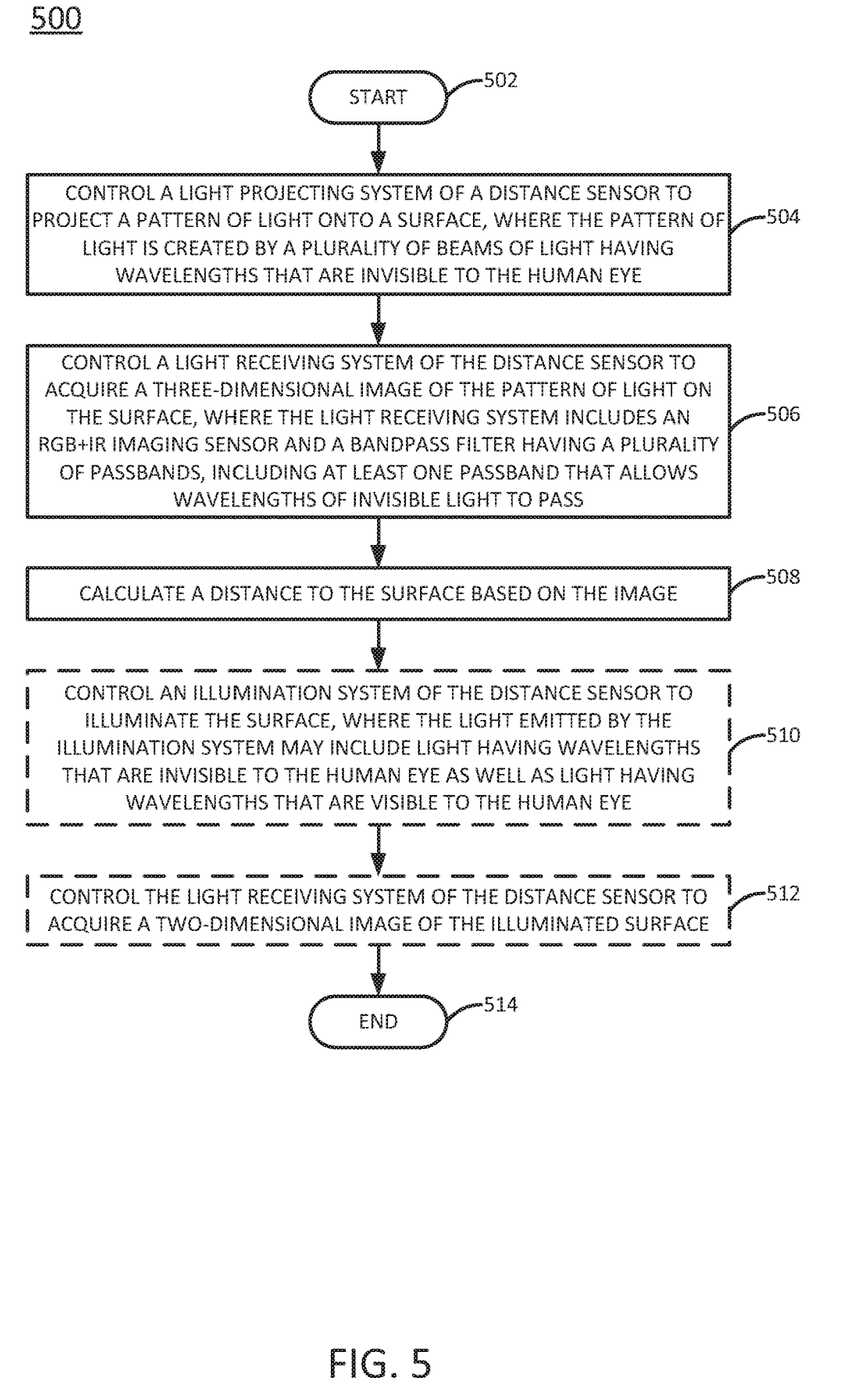
FIG. 5 is a flow diagram illustrating one example of a method for operating a distance sensor for three-dimensional depth sensing and two-dimensional image capture, according to the present disclosure.

FIG. 5 is a flow diagram illustrating one example of a method 500 for operating a distance sensor for three-dimensional depth sensing and two-dimensional image capture, according to the present disclosure. The method 500 may be performed, for example, by the controller 108 illustrated in FIG. 1 or by the processor 602 illustrated in FIG. 6 and discussed in further detail elbow. For the sake of example, the method 500 is described as being performed by a processing system.

The method 500 may begin in step 502. In step 504, the processing system may control a light projecting system of a distance sensor to project a pattern of light onto a surface (e.g., an object whose distance is to be detected, for example), where the pattern of light is created by a plurality of beams of light having wavelengths that are invisible to the human eye. For instance, the plurality of beams of light may comprise infrared light. As discussed above, the pattern of light may comprise points of light that are arranged to form a pattern, such as a grid, on the surface.

In step 506, the processing system may control a light receiving system of the distance sensor to acquire a three-dimensional image of the pattern of light on the surface, where the light receiving system includes an RGB+IR imaging sensor and a bandpass filter having a plurality of passbands, including at least one passband that allows wavelengths of invisible light to pass.

For instance, the RGB+IR imaging sensor may comprise a plurality of photodetectors (or pixels), where the plurality of photodetectors may include photodetectors that are sensitive to different wavelengths of light. As an example, the plurality of photodetectors may include photodetectors that are sensitive to wavelengths of light that are visible to the human eye, such as red photodetectors, green photodetectors, and blue photodetectors. The plurality of photodetectors may also include photodetectors that are sensitive to wavelengths of light that are invisible to the human eye, such as infrared photodetectors.

In this case, the plurality of passbands of the bandpass filter may include at least a first passband and a second passband. The first passband and the second passband may be configured to allow light of different wavelengths to pass through (but to block all other wavelengths of light). For instance, the first passband may transmit one or more wavelengths of light that are visible to the human eye (e.g., RGB wavelengths), while the second passband may transmit one or more wavelengths of light that are invisible to the human eye (e.g., infrared wavelengths).

Thus, in the case of step 506, invisible (e.g., infrared) light emitted in step 504 may be received by (may pass through to) the photodetectors of the imaging sensor that are configured to detect the invisible light; however, the invisible light may not be received by (may be blocked to) the other photodetectors of the imaging sensor (e.g., RGB photodetectors).

In step 508, the processing system may calculate a distance to the surface, or may calculate a three-dimensional depth map of the surface, based on the image acquired in step 506. The calculations may be performed as described in U.S. patent applications Ser. Nos. 14/920,246, 15/149,323, and 15/149,429.

In optional step 510 (illustrated in phantom), the processing system may control an illumination system of the distance sensor to illuminate the surface, where the light emitted by the illumination system may include light having wavelengths that are invisible to the human eye as well as light having wavelengths that are visible to the human eye.

In optional step 512 (illustrated in phantom), the processing system may control the light receiving system of the distance sensor to acquire a two-dimensional image of the illuminated surface. Thus, in the case of step 512, visible (e.g., RGB) light emitted in step 510 may be received by (may pass through to) the photodetectors of the imaging sensor that are configured to detect the visible light; however, the visible light may not be received by (may be blocked to) the other photodetectors of the imaging sensor (e.g., infrared photodetectors).

The method 500 may end in step 514.

It should be noted that although not explicitly specified, some of the blocks, functions, or operations of the method 500 described above may include storing, displaying and/or outputting for a particular application. In other words, any data, records, fields, and/or intermediate results discussed in the method 500 can be stored, displayed, and/or outputted to another device depending on the particular application. Furthermore, blocks, functions, or operations in FIG. 5 that recite a determining operation, or involve a decision, do not imply that both branches of the determining operation are practiced. In other words, one of the branches of the determining operation may not be performed, depending on the results of the determining operation.

Figure 6:
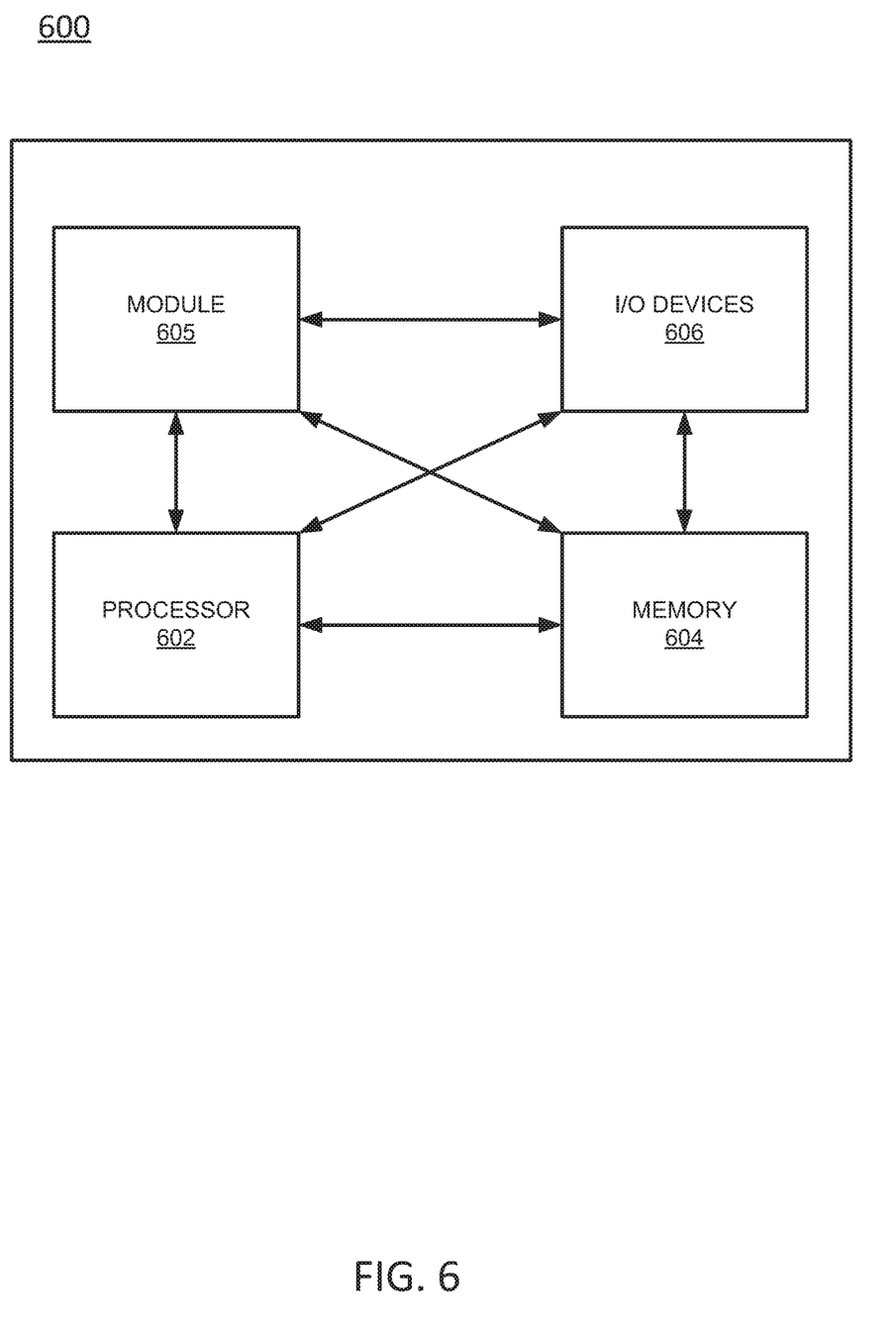
FIG. 6 depicts a high-level block diagram of an example electronic device for operating a distance sensor for three-dimensional depth sensing and two-dimensional image capture.

FIG. 6 depicts a high-level block diagram of an example electronic device 600 for operating a distance sensor for three-dimensional depth sensing and two-dimensional image capture. As such, the electronic device 600 may be implemented as a processor of an electronic device or system, such as a distance sensor (e.g., as controller 108 in FIG. 1).

As depicted in FIG. 6, the electronic device 600 comprises a hardware processor element 602, e.g., a central processing unit (CPU), a microprocessor, or a multi-core processor, a memory 604, e.g., random access memory (RAM) and/or read only memory (ROM), a module 605 for operating a distance sensor for three-dimensional depth sensing and two-dimensional image capture, and various input/output devices 606, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 600 may employ a plurality of processor elements. Furthermore, although one electronic device 600 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 600 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 605 for operating a distance sensor for three-dimensional depth sensing and two-dimensional image capture, e.g., machine readable instructions can be loaded into memory 604 and executed by hardware processor element 602 to implement the blocks, functions or operations as discussed above in connection with the method 500. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for operating a distance sensor for three-dimensional depth sensing and two-dimensional image capture of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
a light projecting system to project a plurality of beams of light, wherein the plurality of beams of light comprise light of a wavelength that is invisible to the human eye, and wherein the plurality of beams of light forms a pattern on a surface when the plurality of beams of light is incident upon the surface;
a light receiving system to acquire a first image of the pattern on the surface and a second two-dimensional image of the surface, wherein the light receiving system comprises:
a lens;
an imaging sensor comprising a plurality of photodetectors, wherein the plurality of photodetectors includes a first subset of photodetectors that is sensitive to a spectrum of light including wavelengths that are visible to a human eye and a second subset of photodetectors that is sensitive to the light of the wavelength that is invisible to the human eye; and
a first bandpass filter positioned between the lens and the imaging sensor, wherein the first bandpass filter includes at least a first passband whose range corresponds to the spectrum of light including the wavelengths that are visible to the human eye and a second passband whose range corresponds to the light of the wavelength that is invisible to the human eye;
an illumination system, wherein the illumination system comprises:
a light source to emit the spectrum of light including the wavelengths that are visible to the human eye and the light of the wavelength that is invisible to the human eye; and
a second bandpass filter that allows the light of the wavelength that is invisible to the human eye that is emitted by the light source to pass to illuminate the surface while blocking the wavelengths that are visible to the human eye that are emitted by the light source; and
a controller to control the light projecting system to project the plurality of beams of light during a first period of time, to control the illumination system to emit the spectrum of light including the wavelengths that are visible to a human eye and the light of the wavelength that is invisible to the human eye during a second period of time that does not overlap with the first period of time, to set a first exposure duration during which the first image is captured by the light receiving system during the first period of time, the first period of time having a different duration than the first exposure duration, to set a second exposure duration, separate from the first exposure duration, during which the second two-dimensional image is captured by the light receiving system during the second period of time, the second period of time having a different duration than the second exposure duration, and to calculate a distance to the surface based on the first image.

2. The apparatus of claim 1, wherein the light of the wavelength that is invisible to the human eye comprises infrared light.

3. The apparatus of claim 1, wherein the spectrum of light including the wavelengths that are visible to the human eye comprises red, green, and blue light.

4. The apparatus of claim 3, wherein the plurality of photodetectors comprises:
a first plurality of photodetectors that is sensitive to visible red light;
a second plurality of photodetectors that is sensitive to visible green light
a third plurality of photodetectors that is sensitive to visible blue light; and
a fourth plurality of photodetectors that is sensitive to infrared light.

5. The apparatus of claim 4, wherein the second bandpass filter comprises:
a first plurality of passbands that allow visible red light to pass, wherein the first plurality of passbands is positioned over the first plurality of photodetectors;
a second plurality of passbands that allow visible green light to pass, wherein the first plurality of passbands is positioned over the second plurality of photodetectors;
a third plurality of passbands that allow visible blue light to pass, wherein the third plurality of passbands is positioned over the third plurality of photodetectors; and
a fourth plurality of passbands that allow infrared light to pass, wherein the fourth plurality of passbands is positioned over the fourth plurality of photodetectors.

6. The apparatus of claim 1, wherein the spectrum of light including the wavelengths that are visible to the human eye comprises cyan, magenta, and yellow light.

7. The apparatus of claim 1, wherein the second passband overlaps with a wavelength of light to which the second subset of photodetectors is sensitive.

8. The apparatus of claim 1, wherein the second passband is narrower than a wavelength of light to which the second subset of photodetectors is sensitive.

9. The apparatus of claim 1, wherein the first passband is a same the spectrum of light including wavelengths to which the first subset of photodetectors is sensitive.

10. The apparatus of claim 1, wherein the plurality of beams of light comprise coherent light.

11. The apparatus of claim 1, wherein the light projecting system comprises a vertical cavity surface emitting laser.

12. The apparatus of claim 1, wherein the bandpass filter comprises an interference filter.

13. The apparatus of claim 1, wherein the first bandpass filter is positioned to allow the light of the wavelength that is invisible to the human eye to pass through to the second subset of photodetectors but to be blocked from passing through to the first subset of the photodetectors.

14. The apparatus of claim 13, wherein the first bandpass filter is further positioned to allow light in the spectrum of light including the wavelengths that are visible to the human eye to pass through to the first subset of photodetectors but to be blocked from passing through to the second subset of the photodetectors.

15. A method, comprising:
controlling, by a processing system of a distance sensor, a light projecting system of the distance sensor to project a plurality of beams of light during a first period of time, wherein the plurality of beams of light comprise light of a wavelength that is invisible to a human eye, and wherein the plurality of beams of light forms a pattern on a surface when the plurality of beams of light is incident upon the surface;
controlling, by the processing system, a light receiving system of the distance sensor to acquire a first image of the pattern on the surface while the light projecting system projects the plurality of beams during a first exposure duration set by the processing system, wherein the first exposure duration occurs within the first period of time, the first period of time having a different duration than the first exposure duration;
controlling, by the processing system, an illumination system of the distance sensor to emit a spectrum of light including wavelengths that are visible to the human eye and the light of the wavelength that is invisible to the human eye during a second period of time that is non-overlapping with the first period of time, wherein the illumination system includes a first bandpass filter that blocks the spectrum of light including the wavelengths that are visible to the human eye that is emitted by the illumination system while allowing the light of the wavelength that is invisible to the human eye that is emitted by the illumination system to pass to illuminate the surface;
controlling, by the processing system, the light receiving system to acquire a second two-dimensional image of the surface while the illumination system emits the spectrum of light including wavelengths that are visible to the human eye and the light of the wavelength that is invisible to the human eye during a second exposure duration set by the processing system, wherein the second exposure duration occurs within the second period of time, the second period of time having a different duration than the second exposure duration, wherein the light receiving system comprises:
a lens;
an imaging sensor comprising a plurality of photodetectors, wherein the plurality of photodetectors includes a first subset of photodetectors that is sensitive to the spectrum of light including the wavelengths that are visible to the human eye and a second subset of photodetectors that is sensitive to the light of the wavelength that is invisible to the human eye; and
a second bandpass filter positioned between the lens and the imaging sensor, wherein the second bandpass filter includes at least a first passband whose range corresponds to the spectrum of light including the wavelengths that are visible to the human eye and a second passband whose range corresponds to the light of the wavelength that is invisible to the human eye; and
calculating, by the processing system, a distance to the surface based on the first image.

16. The method of claim 15, wherein the light of the wavelength that is invisible to the human eye comprises infrared light.

17. The method of claim 15, wherein the second bandpass filter is positioned to allow the light of wavelength that is invisible to the human eye to pass through to the second subset of photodetectors but to be blocked from passing through to the first subset of the photodetectors, and wherein the second bandpass filter is further positioned to allow light in the spectrum including the wavelengths that are visible to the human eye of light to pass through to the first subset of photodetectors but to be blocked from passing through to the second subset of the photodetectors.

18. The method of claim 15, wherein the second two-dimensional image of the surface is an infrared two-dimensional image.

19. A non-transitory machine-readable storage medium encoded with instructions executable by a processor of a distance sensor, wherein, when executed, the instructions cause the processor to perform operations, the operations comprising:
controlling a light projecting system of the distance sensor to project a plurality of beams of light during a first period of time, wherein the plurality of beams of light comprise light of a wavelength that is invisible to a human eye, and wherein the plurality of beams of light forms a pattern on a surface when the plurality of beams of light is incident upon the surface;
controlling a light receiving system of the distance sensor to acquire a first image of the pattern on the surface while the light projecting system projects the plurality of beams during a first exposure duration set by the processing system, wherein the first exposure duration occurs within the first period of time, the first period of time having a different duration than the first exposure duration;
controlling an illumination system of the distance sensor to emit a spectrum of light including wavelengths that are visible to the human eye and the light of the wavelength that is invisible to the human eye during a second period of time that is non-overlapping with the first period of time, wherein the illumination system includes a first bandpass filter that blocks the spectrum of light including the wavelengths that are visible to the human eye that is emitted by the illumination system while allowing the light of the wavelength that is invisible to the human eye that is emitted by the illumination system to pass to illuminate the surface,
controlling the light receiving system to acquire a second two-dimensional image of the surface while the illumination system emits the spectrum of light including wavelengths that are visible to the human eye and the light of the wavelength that is invisible to the human eye during a second exposure duration set by the processing system, wherein the second exposure duration occurs within the second period of time, the second period of time having a different duration than the second exposure duration, wherein the light receiving system comprises:
a lens;
an imaging sensor comprising a plurality of photodetectors, wherein the plurality of photodetectors includes a first subset of photodetectors that is sensitive to the spectrum of light including the wavelengths that are visible to the human eye and a second subset of photodetectors that is sensitive to the light of the wavelength that is invisible to the human eye; and a second bandpass filter positioned between the lens and the imaging sensor, wherein the first second bandpass filter includes at least a first passband whose range corresponds to the spectrum of light including the wavelengths that are visible to the human eye and a second passband whose range corresponds to the light of the wavelength that is invisible to the human eye; and calculating a distance to the surface based on the first image.

20. The non-transitory machine-readable storage medium of claim 19, wherein the second two-dimensional image of the surface is an infrared two-dimensional image.

\* \* \* \* \*